(12) United States Patent
Sargeant et al.

(10) Patent No.: US 11,203,187 B2
(45) Date of Patent: Dec. 21, 2021

(54) HIGH BARRIER ORIENTED FILMS

(71) Applicant: FLEX FILMS (USA), INC., Elizabethtown, KY (US)

(72) Inventors: Steven Sargeant, Elizabethtown, KY (US); Rajeev Parashar, New Delhi (IN); Dinesh Sargaiyan, New Delhi (IN); Sudhir Naik, New Delhi (IN); J. K. Sharma, New Delhi (IN); Aarushi Srivastava, New Delhi (IN); Krishna Kant Sharma, Elizabethtown, KY (US)

(73) Assignee: Flex Films (USA), Inc., Elizabethtown, KY (US)

( * ) Notice: Subject to any disclaimer, the term of this patent is extended or adjusted under 35 U.S.C. 154(b) by 154 days.

(21) Appl. No.: 16/036,620

(22) Filed: Jul. 16, 2018

(65) Prior Publication Data

US 2019/0016099 A1 Jan. 17, 2019

Related U.S. Application Data

(60) Provisional application No. 62/532,472, filed on Jul. 14, 2017.

(51) Int. Cl.
*B32B 27/08* (2006.01)
*B32B 27/20* (2006.01)
(Continued)

(52) U.S. Cl.
CPC .............. *B32B 27/08* (2013.01); *B32B 27/16* (2013.01); *B32B 27/18* (2013.01); *B32B 27/20* (2013.01); *B32B 27/32* (2013.01); *B32B 27/34* (2013.01); *B32B 27/36* (2013.01); *C08G 63/189* (2013.01); *C08G 63/199* (2013.01); *C08K 3/24* (2013.01); *C08K 5/098* (2013.01); *B32B 2250/24* (2013.01); *B32B 2250/244* (2013.01); *B32B 2255/10* (2013.01); *B32B 2255/205* (2013.01);
(Continued)

(58) Field of Classification Search
CPC .......... B32B 2250/24; B32B 2250/244; B32B 2255/10; B32B 2255/205; B32B 2255/24; B32B 2255/26; B32B 2264/102; B32B 2270/00; B32B 2307/412; B32B 2307/518; B32B 2307/7244; B32B 2307/7246; B32B 2307/746; B32B 2439/70; B32B 2439/80; B32B 27/08; B32B 27/16; B32B 27/18; B32B 27/20; B32B 27/32; B32B 27/34; B32B 27/36; C08G 63/189; C08G 63/199; C08K 3/24; C08K 5/098
See application file for complete search history.

(56) References Cited

U.S. PATENT DOCUMENTS 4,957,980 A 9/1990 Kobayashi et al.
5,552,512 A 9/1996 Sublett
(Continued)

FOREIGN PATENT DOCUMENTS

EP 1 980 590 A1 10/2008

OTHER PUBLICATIONS

International Search Report for Application No. PCT/US2018/042311, dated Oct. 25, 2018.

*Primary Examiner* — Frances Tischler
(74) *Attorney, Agent, or Firm* — Dinsmore & Shohl LLP (57) ABSTRACT

A high barrier oriented PET film includes one or more PET layers forming a core of the PET film and one or more outer layers of a dispersed nylon containing PET positioned on the core.

15 Claims, 4 Drawing Sheets

(51) Int. Cl.
*B32B 27/16* (2006.01)
*B32B 27/18* (2006.01)
*B32B 27/32* (2006.01)
*B32B 27/34* (2006.01)
*B32B 27/36* (2006.01)
*C08G 63/189* (2006.01)
*C08G 63/199* (2006.01)
*C08K 3/24* (2006.01)
*C08K 5/098* (2006.01)

(52) U.S. Cl.
CPC ....... *B32B 2255/24* (2013.01); *B32B 2255/26* (2013.01); *B32B 2264/102* (2013.01); *B32B 2270/00* (2013.01); *B32B 2307/412* (2013.01); *B32B 2307/518* (2013.01); *B32B 2307/7244* (2013.01); *B32B 2307/7246* (2013.01); *B32B 2307/746* (2013.01); *B32B 2439/70* (2013.01); *B32B 2439/80* (2013.01)

(56) References Cited

U.S. PATENT DOCUMENTS

| | | | |
|---|---|---|---|
| 6,933,055 | B2 | 8/2005 | Share et al. |
| 7,943,216 | B2 | 5/2011 | Liu et al. |
| 8,097,662 | B2 | 1/2012 | Schmidt et al. |
| 8,304,499 | B2 | 11/2012 | Shelby et al. |
| 9,018,284 | B2 | 4/2015 | Akkapeddi et al. |
| 9,580,798 | B2 | 2/2017 | Sargeant et al. |
| 10,676,812 | B2 | 6/2020 | Sargeant et al. |
| 2004/0146727 | A1 | 7/2004 | Klein et al. |
| 2006/0286349 | A1 | 12/2006 | Klein et al. |
| 2008/0153939 | A1* | 6/2008 | Schmidt .................. B32B 27/18 523/100 |
| 2015/0004387 | A1* | 1/2015 | Sargeant ................ C09D 5/002 428/220 |
| 2017/0137934 | A1 | 5/2017 | Sargeant et al. |

* cited by examiner

Typical biaxially oriented PET film surface after metallization

FIG. 8

DN Surface after metallization

FIG. 9

HIGH BARRIER ORIENTED FILMS

BACKGROUND OF THE INVENTION

1. Field of the Invention

The presently-disclosed subject matter includes high barrier films, structures including the high barrier films, and processes for producing and using the high barrier films and structures. In particular, the presently-disclosed subject matter includes polyethylene terephthalate (PET) films containing dispersed nylon that provide enhanced gas barrier properties as compared to standard barrier models, structures including such PET films, and methods of making and using the PET films and structures.

2. Description of the Background Art

Gas barrier properties are essential attributes that dictate the shelf-life of food, drugs and other commodities. Glass, steel, aluminum and other rigid materials have a long history as materials used in the construction of packaging vessels with good gas barrier properties. Although rigid materials have excellent barrier and product protection attributes, consumer preferences, cost and other issues exist with these materials. Therefore, there has been a need in the art for the construction of flexible packaging materials with high gas barrier properties.

In the case of flexible materials, gas barrier polymers are typically applied to the construction of packages needing high barrier properties. Polymeric materials have a range of gas barrier properties depending on the density of the polymer, glass transition of the polymer or polymer blend, and specific interactions of the polymer structural chemistry with the gaseous substances. In the art, it is well known that polyethyleneterephthalate (PET) provides good oxygen, carbon dioxide, and moisture barrier. Orientation of PET is well known to increase the crystallization of the material and is a mechanism to provide even higher barrier performance properties. For many commodities, the inherent barrier properties of oriented PET are sufficient for functional needs of the packaged materials.

However, in certain applications, the barrier properties of PET alone are not sufficient. In these instances, one method for improving the barrier properties includes blending of the PET with other resins. However, the miscibility of PET with many resins is poor and this technique has limited utility. Another approach includes copolymerizing PET with other moieties like naphthalate, isophthalates, butylene diol, propylene diol, and other monomers to increase the barrier properties thereof. An additional method includes co-extrusion or coating of PET with barrier materials like ethylen-evinyl alcohol (EVOH) copolymers, polyvinyl alcohol polymers and copolymers, or polyvinylenedene chloride (PVDC). Frequently, the ability of recycling PET with mixed copolymers is poor and may lead to degradation of the bulk materials, discoloration, gels or other issues. Although viable from a technology perspective, the overall cost implications of these approaches often times put them out of the reach of commodity packaging applications.

In addition to the passive barrier approaches described above, active barrier approaches are well known in the art for the construction of packaging structures with enhanced oxygen barrier performance. Although the overall mechanisms of this approach are typically not well characterized, they often are thought to involve the oxidation of part of the polymer material under mediation of a metal catalyst like cobalt etc. Several examples of active barrier approaches have been commercialized in the production of beverage containers based on PET resin blends.

For example, U.S. Pat. No. 4,957,980 describes the formulation of high barrier blends of polyesters and copolyesters with polyamides containing metaxylylene moieties, where the use of a compatabilizing resin is needed to ensure consistency of the blended resins. U.S. Pat. No. 5,552,512 describes copolyesters comprising repeat units of naphthalene dicarboxylic acid, terephthalic acid and essentially 100 mole percent 1,4-cyclohexanedimethanol (CHDM), wherein CHDM has a cis isomer content of at least 50%. U.S. Pat. No. 6,933,055 describes the multilayered packages formed from blends of PET, Polyamide MXD6 and oxygen scavenger material. U.S. Pat. No. 7,943,216 describes a blend of polyester aromatic polyamide (preferably MXD6) with ionic compatibilizer and a cobalt salt. The article comprising the composition is claimed to have an oxygen barrier of <0.01 cc (STP)-cm/m2-atm-day after 100 hours in oxygen. U.S. Pat. No. 8,097,662 describes the use of a polyamide barrier resin and transition metals. The blend is heat-treated to enhance oxygen scavenging effects. U.S. Pat. No. 8,304,499 describes blends comprising at least one thermoplastic polymer and a copolyamide or a blend of at least two polyamides to form transparent, low haze and high barrier films. U.S. Pat. No. 9,018,284 describes the construction of a barrier resin and metal complex suitable for use in the construction of barrier containers of PET.

Additionally, U.S. Patent Application Publication No. 2006/0286349A1 describes the use of poly (m-xylene-adipamide) as an additional polymer in biaxially oriented polyester/copolyester films. Furthermore, EP 1980590A1 describes PET resin composition with dispersed nanoclay particles in DMF medium. The CSD bottles formed from this composition have been claimed to have better barrier properties. However, none of these references provide sufficiently enhanced gas barriers or suitable methods of achieving such enhanced barriers.

SUMMARY OF THE INVENTION

One embodiment of this invention is directed to a high barrier oriented PET film comprising a core of one or more PET layers of the PET film and one or more outer layers of a dispersed nylon containing PET positioned on the core. At least one, of the one or more, PET layers may comprise a PET homopolymer. At least one of the one or more PET layers may comprise a PET layer with one or more additives. At least one of the one or more PET layers may comprise a PET copolymer. The PET copolymer may comprise PET and one or more additional co-monomers of diethylene glycol, propylene glycol, neopentyl glycol, polyalkylene glycols, 1,4-butane diol, 1,3-propane diol, adipic acid, sebacic acid, malonic acid, succinic acid, isophthalic acid, or 2,6-napthalenedicarboxylic acid.

The invention may further comprise a metal barrier layer over at least one of the one or more outer layers. The metal barrier layer may comprise at least one of aluminum, silicon oxide, or aluminum oxide. The metal barrier layer may be applied in an amount sufficient to provide an oxygen transmission rate of less than 1.0 cc/m²/day.

The invention may further comprise at least one coating positioned over the core and/or the at least one of the one or more outer layers. The at least one coating may comprise an acrylic coating, a polyurethane coating, a polysulphonester coating, a quaternary ammonium-based coating, or a mixture thereof. Preferably, the at least one coating may be an acrylic coating. The acrylic coating may comprise an acrylic resin, which may be a resin having one or more monomer components of an alkyl acrylate, an alkyl methacrylate, 2-hydroxyethyl acrylate, 2-hydroxyethyl methacrylate, 2-hydroxypropyl acrylate, 2-hydroxypropyl methacrylate, acrylamide, methacrylamide, N-methyl acrylamide, N-methyl methacrylamide, N-methylol acrylamide, N-methylol methacrylamide, N,N-dimethylol acrylamide, N-methoxymethyl acrylamide, N-methoxymethylmethacrylamide, N-phenyl acrylamide, N,N-diethylamino ethyl acrylate, N,N-diethylamino ethyl methacrylate, glycidyl acrylate, glycidyl methacrylate, acrylic acid or a salt thereof, or methacrylic acid or a salt thereof. The acrylic coating may further comprise one or more cross-linking agents. The one or more cross-linking agents may comprise melamine-based cross-linkers, epoxy-based cross-linkers, aziridine-based cross-linkers, epoxyamide compounds, titanate-based coupling agents, oxazoline-based cross-linkers, isocyanate-based cross-linkers, methylolurea or alkylolurea-based cross-linkers, aldehyde-based cross-linkers, or acrylamide-based cross-linkers. The one or more cross-linking agents may produce a cross-linked acrylic coating having a cross-linking density of greater than about 10%.

The high barrier oriented PET film may be corona treated.

Another embodiment of this invention is directed to a high barrier oriented PET film comprising a core of one or more PET layers, one or more outer layers of a dispersed nylon containing PET positioned on the core, wherein the one or more outer layers are produced by co-extruding a dispersed nylon phase with the PET, and optionally depositing a metal barrier layer over at least one of the one or more outer layers. The metal barrier layer may be deposited over at least one of the one or more outer layers by vacuum deposition, physical vapor deposition, or chemical vapor deposition.

Yet another embodiment of this disclosure is directed to a method of manufacturing a high barrier oriented PET film comprising co-extruding a core layer resin of PET and an outer layer resin of a dispersed nylon containing PET to form a multi-layer stack. The method may further comprise depositing a metal barrier layer over the multi-layer stack.

Further scope of applicability of the disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to one of ordinary skill in the art from this detailed description.

BRIEF DESCRIPTION OF THE DRAWINGS

The disclosure will become more fully understood from the detailed description given below and the accompanying drawings that are given by way of illustration only and are thus not limitative of the disclosure.

DESCRIPTION OF EXEMPLARY EMBODIMENTS

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

Unless defined otherwise, all technical and scientific terms used herein have the same meaning as is commonly understood by one of skill in the art to which the invention(s) belong. All patents, patent applications, published applications and publications, databases, websites and other published materials referred to throughout the entire disclosure herein, unless noted otherwise, are incorporated by reference in their entirety. In the event that there is a plurality of definitions for terms herein, those in this section prevail. Where reference is made to a URL or other such identifier or address, it understood that such identifiers can change and particular information on the internet can come and go, but equivalent information can be found by searching the internet. Reference thereto evidences the availability and public dissemination of such information.

Although any methods, devices, and materials similar or equivalent to those described herein can be used in the practice or testing of the presently-disclosed subject matter, representative methods, devices, and materials are now described.

Following long-standing patent law convention, the terms "a," "an," and "the" refer to "one or more" when used in this application, including the claims. Thus, for example, reference to "a layer" includes a plurality of such layers, and so forth, unless indicated otherwise.

Also unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The presently-disclosed subject matter includes high barrier films, structures including the high barrier films, and processes for producing and using the high barrier films and structures. In particular, the presently-disclosed subject matter includes polyethylene terephthalate (PET) films containing dispersed nylon that provide enhanced gas barrier properties as compared to standard barrier models, structures including such PET films, and methods of making and using the PET films and structures.

In some embodiments of the presently-disclosed subject matter, a high-barrier film is provided that comprises at least one biaxially-oriented PET film or layer including dispersed nylon. In some embodiments, as illustrated in FIGS. 1-3 and 6, the high-barrier oriented film includes one or more biaxially-oriented core layers (11) and one or more biaxially-oriented outer layers (21). In one embodiment, the one or more biaxially-oriented core layers form a core portion (10) having a first surface and a second surface, the second surface being opposite the first surface with respect to the core portion (10). In another embodiment, one or more of the biaxially-oriented outer layers (21) is positioned over the first surface and/or the second surface of the core portion (10).

Each of the biaxially-oriented core layers (11) individually includes a PET homopolymer and/or a PET layer including one or more additives, such as silica. Regardless, a PET layer for the core means that the layer contains at least 50% PET. PET homopolymers, as used herein, include a PET layer consisting of only polyethylene terephthalate. Alternatively, the one or more additives may be included in the PET layer by combining a PET resin with an additive containing master resin. The additive containing master resin may include any suitable concentration of additive and/or be combined with the PET resin at any suitable concentration. For example, in one embodiment, the PET layer including one or more additives comprises a combination of PET resin and silica containing PET resin. The combination of a PET resin and additive may be at a ratio of between 50:50 and 99:1, between 50:50 and 95:5, 50:50 and 90:10, 60:40 and 90:10, 70:30 and 90:10, 75:25 and 85:15, about 80:20, or any suitable combination, sub-combination, range, or sub-range thereof.

Additionally or alternatively, in some embodiments, one or more of the biaxially-oriented core layers (11) includes a PET copolymer, where the PET layer includes PET and one or more additional co-monomers. Additional co-monomers that can be used in this regard include diethylene glycol, propylene glycol, neopentyl glycol and polyalkylene glycols, 1,4-butane diol, 1,3-propane diol, and dicarboxylic acids such as adipic acid, sebacic acid, malonic acid, succinic acid, isophthalic acid, and 2,6-napthalenedicarboxylic acid. In certain embodiments, the PET copolymer includes a polyethylene terephthalate copolyester, where the polyethylene terephthalate layer includes one or more diacids, diols, or combinations thereof. For instance, in one embodiment, a polyethylene terephthalate copolyester obtained from recycled content bottle resin (i.e., PET resin with about 2% isophthalic acid) can be utilized to enhance the draw properties of an exemplary film.

As discussed above, one or more outer layers (21) are positioned over at least one surface of the core portion (10). Each of the one or more outer layers (21) includes dispersed nylon containing PET (DN) or a blend of dispersed nylon PET and silica containing master resin of PET. In the layer of dispersed nylon containing PET for the outer layer, the ratio of dispersed nylon to PET is 20:80 to 95:5, preferably 50:50 to 95:5, and more preferably 60:40 to 95:5. The dispersed nylon containing PET has a dispersion size of less than about 200 nm. As such, the films are clear. The DN and the silica containing PET may be provided at any suitable ratio in the DN/silica containing PET blend. Suitable ratios of DN to silica containing PET include, but are not limited to, between 50:50 and 99:1, between 60:40 and 99:1, 70:30 and 99:1, 80:20 and 99:1, 85:15 and 99:1, 90:10 and 99:1, about 90:10, about 95:5, or any suitable combination, sub-combination, range, or sub-range thereof.

Regardless of whether the core layers (11) include PET homopolymers, PET copolymers, or PET layers including one or more additives, the core layer(s) (11) and outer layer(s) (21) included in the films of the presently-disclosed subject matter are generally prepared by processes known to those of ordinary skill in the art including the use of conventional sequential biaxial orientation machines having a single screw mainline extrusion train and a twin screw sub-extrusion process. In this regard, in some embodiments, standard pellets or a blend of pellets including a core layer material having a desired intrinsic viscosity can be fed into the main extrusion line, while standard pellets or a blend of pellets including an outer layer material can be fed in to the sub-extrusion process, such that the materials can be melted separately and then laminated together in a feed-block to produce a desired molten structure (e.g., an A/B/A molten structure) in an extrusion die. For example, in one embodiment, a blend of standard PET pellets and silica-filled PET pellets is fed into the main extrusion line, and DN pellets are fed into the sub-extrusion process.

In certain embodiments, co-extrusion of the core layer resin and the outer layer resin is modified to include a square mixer process. In some embodiments, the square mixer process increases the number of layers produced and/or increases the barrier properties of the resulting multi-layer stack.

In some embodiments, the materials or layers emerging from the extrusion die are then quenched on a chilled casting drum to produce a thick, amorphous film structure. The core and outer layers are then preferably stretched about 2 to about 5 times in the machine, or longitudinal, direction and about 2 to about 5 times in the transverse direction, or cross, direction, followed by heat crystallization. In some embodiments, after stretching the extruded layers in the longitudinal and transverse direction and crystallization, one or more of the layers is obtained having a tensile strength of at least about 2500 kg/cm$^2$ in both the transverse and the longitudinal direction of the film, and having dimensions that are about 3.4 times those originally found in the layers in both the longitudinal and transverse direction.

The thickness of the resulting films can depend on a variety of factors, including, but not limited to, the number of layers in the film, the thickness of the individual layers, the stretching ratio, and the like. In some embodiments, by stretching the resulting film in the above-described manner, the film has a total thickness of about 100 µm or less, a total thickness of about 70 µm or less, a total thickness of about 50 µm or less, a total thickness of about 30 µm or less, or a total thickness of about 10 µm or less. In some embodiments, the film has a total thickness of about 5 µm to about 50 µm, including about 5 µm, 10 µm, 15 µm, 20 µm, 25 µm, 30 µm, 35 µm, 40 µm, 45 µm, and 50 µm. In some embodiments, the film has a total thickness of about 6 µm to about 12 µm, including about 6 µm, about 7 µm, about 8 µm, about 9 µm, about 10 µm, about 11 µm, and about 12 µm.

Figure 5:
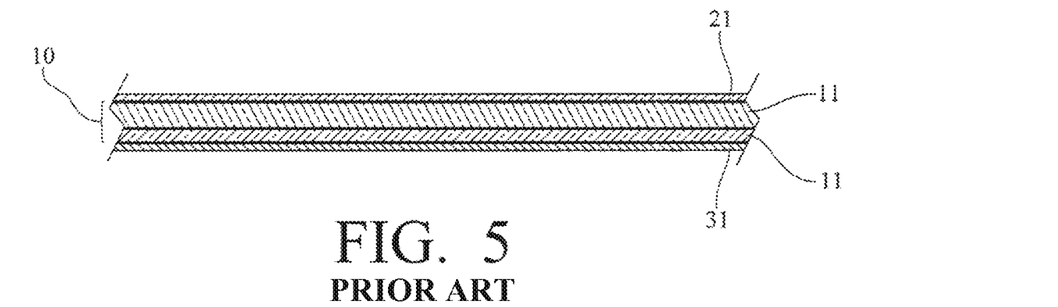
FIG. 5 is a schematic diagram of a comparative film including a single layer of a dispersed nylon containing PET layer and a metallized layer opposite the dispersed nylon layer with respect to a core portion.
Figure 6:
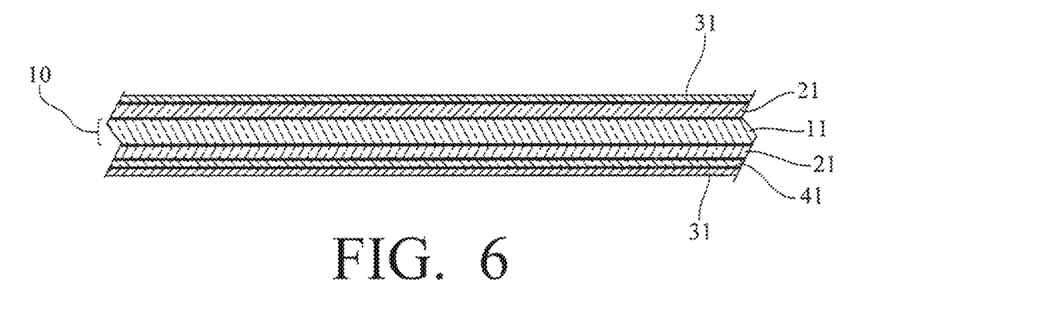
FIG. 6 is a schematic diagram of a film including a dual layer of dispersed nylon containing PET, a coating layer, and dual metallized layers, according to an embodiment of the disclosure.
Figure 7:
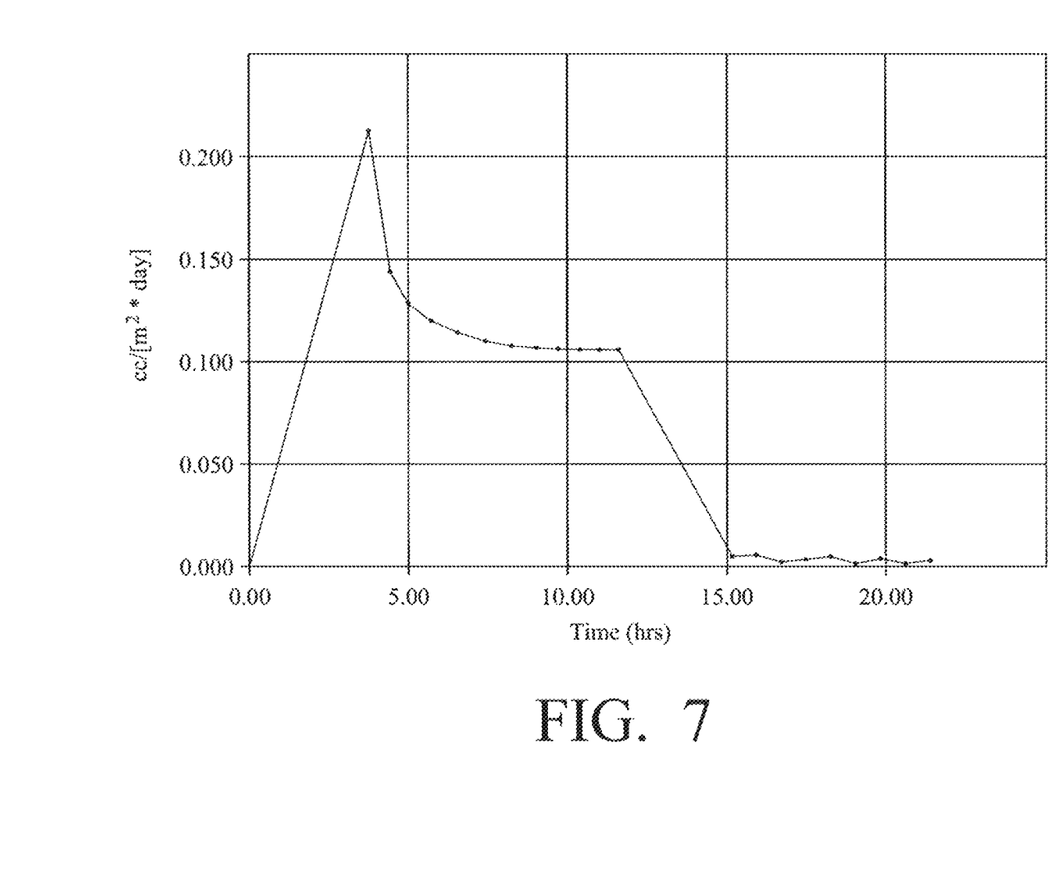
FIG. 7 is a graph showing gas barrier properties of a high-barrier oriented film.

After extruding and/or stretching, in some embodiments, a metal barrier layer is applied over at least one side of the film. The term "metal barrier layer" is used herein to refer to both traditional metallized layers, such as aluminum layers, as well as more ceramic-like layers, such as layers comprised of silicon oxide and/or aluminum oxide. Such metal barrier layers are applied using a number of deposition methods including, but not limited to, vacuum deposition, physical vapor deposition, or chemical vapor deposition. For example, in one embodiment, the metal barrier layer is an aluminum oxide layer that is applied by vacuum vapor deposition in a vacuum in situ, where aluminum is heated under low pressure conditions (e.g., less than about $1.0 \times 10^{-3}$ mbar) in the presence oxygen gas to allow the aluminum to form a vapor at lower temperature and then be applied to the film as a clear barrier layer of aluminum oxide without causing thermal damage to the other layers during its application. In another embodiment, the metal barrier layer can be in the form of an aluminum layer that can be formed by heating an aluminum wire fed to the surface of an electrically heated plate or by heating an ingot of aluminum within a crucible, and then condensing the resulting aluminum vapor on at least one side of the film. In this regard, in such embodiments, the films are typically vacuum metallized to an optical density of at least about 2.6 to provide a film capable of providing a high gas barrier In some embodiments, the metal barrier layer(s) are applied over at least one of the outer layer(s) (21). For example, referring to FIG. 2, in one embodiment, the metal barrier layer (31) is applied over the outer layer (21) on a first surface of the core portion (10). In another embodiment, as illustrated in FIG. 6, the metal barrier layer (31) is applied over the outer layer (21) on both a first surface of the core portion (10) and an opposite second surface of the core portion (10). Additionally or alternatively, as illustrated in FIG. 5, the metal barrier layer (31) may be applied directly over the core portion (10), opposite the outer layer (21).

Without wishing to be bound by theory, it is believed that the highly dispersed nylon phase within outer film layers results in improved metal grain boundaries for vapor deposited film structures. Accordingly, the smaller and tighter grain boundaries result in significantly enhanced barrier properties, substantially beyond what would be predicted by standard barrier models. In this regard, in one embodiment, an amount of aluminum metal is applied to film sufficient to provide an oxygen transmission rate of less than 1.0 cc/m$^2$/day, less than 0.9 cc/m$^2$/day, less than 0.8 cc/m$^2$/day, less than 0.7 cc/m$^2$/day, less than 0.6 cc/m$^2$/day, less than 0.5 cc/m$^2$/day, less than 0.4 cc/m$^2$/day, less than 0.3 cc/m$^2$/day, less than 0.2 cc/m$^2$/day, less than 0.1 cc/m$^2$/day, or any suitable combination, sub-combination, range, or sub-range thereof. In another embodiment, the oxygen transmission rate of the presently-disclosed films is less than about 0.5 cc/m$^2$/day, such as, in certain embodiments, less than about 0.2 cc/m$^2$/day.

Additionally or alternatively, in some embodiments, the film includes one or more coatings positioned over a core layer (11) and/or an outer layer (21). Suitable coatings applied over at least one side of the film include, but are not limited to, an acrylic coating, a polyurethane coating, a polysulphonester coating, and a quaternary ammonium-based coating. Such coatings can be applied to the film described herein by a number of methods, including application of the coating material in a dispersion or solution of water, and by an application method such as gravure coating, wire wound rod coating, slot die, knife over roll, or any variation of roll coating. In some embodiments, the coating material is applied by inline coating, whereby the coating material is applied to the film as it is being produced.

In some embodiments, the polyurethane coatings utilized in a film of the presently-disclosed subject matter can be comprised of any particular high molecular weight components well known in the art, including, in certain embodiments, aliphatic polyurethane coatings with a Tg greater than 50° C. Exemplary polysulphonester coatings that are utilized are typically of a higher molecular weight to avoid blocking after coating and drying within process. Such polysulphonester coatings include, in certain embodiments, those with a compositional Tg greater than 35° C. In some embodiments that make use of quaternary ammonium based coatings, the quaternary ammonium based coating can be of any class of high molecular weight quaternary ammonium coatings sufficient to prevent transfer within the film making process.

In some embodiments, the coating applied to the film is in form of an acrylic primer, which, in certain embodiments, can then form a cross-linked acrylic primer layer on the film. In some embodiments, the acrylic primer is highly cross-linked and capable of providing a low coefficient of friction (COF) to metal to increase the contact of film to metal and to facilitate the vacuum metallizing process described herein. Descriptions of particularly suitable coating properties are found in U.S. Pat. No. 9,580,798, which is incorporated here by reference. Regardless of the particular type of metal barrier layer that is applied, in some embodiments, including the acrylic primer layer having a low COF to metal permits the film to continually be in sufficient contact with a chill roll to ensure that no thermal defects are included on the film as the high-barrier metal layer is produced.

In one embodiment, the thickness of the acrylic primer layer applied to one or both sides of the film is about 0.05 µm to about 0.3 µm, specifically about 0.3 µm, about 0.25 µm, about 0.2 µm, about 0.15 µm, about 0.10 µm, or about 0.05 µm. In another embodiment, the dynamic COF of the acrylic layer of the film to the metal is about 0.15 µD to about 0.45 µD when heated to 150° C. In some embodiments, the dynamic COF of the acrylic layer of the film to the metal is about 0.15 µD, about 0.20 µD, about 0.25 µD, about 0.30 µD, about 0.35 µD, about 0.40 µD, or about 0.45 µD. In a further embodiment, the dynamic COF of the acrylic layer of the film to the metal is less than about 0.45 µD when heated to 150° C. In certain embodiments, the COF of the acrylic layer of the film to the metal is less than about 0.20 µD when heated to 150° C.

In some embodiments, to produce an acrylic primer layer having such properties, the acrylic primer layer can be comprised of an acrylic resin that adheres well to a polyethylene terephthalate layer. Such acrylic resins can be selected from resins having a monomer component such as, for example, an alkyl acrylate, an alkyl methacrylate, (examples of such alkyl groups include a methyl group, an ethyl group, an n-propyl group, an isopropyl group, an n-butyl group, an isobutyl group, a t-butyl group, a 2-ethylhexyl group, a lauryl group, a stearyl group, a cyclohexyl group, a phenyl group, a benzyl group, a phenylethyl group and the like), a monomer having a hydroxyl group such as 2-hydroxyethyl acrylate, 2-hydroxyethyl methacrylate, 2-hydroxypropyl acrylate, 2-hydroxypropyl methacrylate or the like, a monomer having an amide group such as acrylamide, methacrylamide, N-methyl acrylamide, N-methyl methacrylamide, N-methylol acrylamide, N-methylol methacrylamide, N,N-dimethylol acrylamide, N-methoxymethyl acrylamide, N-methoxymethylmethacrylamide, N-phenyl acrylamide or the like, a monomer having an amino group such as N,N-diethylamino ethyl acrylate, N,N-diethylamino ethyl methacrylate or the like, a monomer having an epoxy group such as glycidyl acrylate, glycidyl methacrylate or the like, a monomer having a carboxylic acid or a salt thereof such as acrylic acid, methacrylic acid or a salt thereof (an alkali metal salt, an alkali earth metal salt, an ammonium salt or the like) and the like whereupon one or more types of such monomer components are copolymerized.

In some embodiments, the acrylic primer is comprised of a copolymer of methyl methacrylate that further includes methacrylic acid and methacrylonitrile. In some embodiments, the acrylic primer is comprised of a co-polymer of methylmethacrylate, butylacrylate, methacrylic acid, methyl acrylate, acrylic acid, and hydroxyethylmethacrylate, alone or in combination with other monomers, as such a combination of monomers has been observed to produce an acrylic primer layer having sufficient hardness and COF values as well as a sufficient ability to adhere to down-stream sealants including, but not limited to, polyethylene, ethylene vinyl acetate, ethylene methyl acrylate, and copolymers and terpolymers thereof.

In addition to the acrylic components of the acrylic primer layer, one or more cross-linking agents are typically also included in the acrylic primer layer to harden the acrylic primer layer, to reinforce the bonding between the various layers of the high-barrier film, and to also provide a highly cross-linked layer capable of providing increased thermal resistance when the film is subsequently vacuum-metallized. Exemplary cross-linking agents that can be used with the acrylic components include, but are not limited to, melamine-based cross-linkers, epoxy-based cross-linkers, aziridine-based cross-linkers, epoxyamide compounds, titanate-based coupling agents (e.g., titanium chelate), oxazoline-based cross-linkers, isocyanate-based cross-linkers, methylolurea or alkylolurea-based cross-linkers, aldehyde-based cross-linkers, and acrylamide-based cross-linkers. In some embodiments, the cross-linking agent is selected from melamine, epoxy-based cross-linkers, and aldehyde-based cross-linkers.

In some embodiments, the cross-linking agents are included in the acrylic primer layer to produce a cross-linked acrylic primer layer having a cross-linking density of about 10%, about 15%, about 20%, about 25%, about 30%, or about 40%. In some embodiments, the cross-linking agents are included in the acrylic primer layer to produce a cross-linked acrylic primer layer having a cross-linking density of greater than about 10%.

Once the acrylic primer layer has been applied to the film, an electrical treatment, such as a plasma or corona treatment, can then be optionally used to change the surface energy on one or more sides of the film, thereby allowing for increased bond strength between the film and the metal barrier layer upon its deposition. In some embodiments, the layers can be corona treated to a dyne value of about 50 to about 60 dynes (e.g., 56 dynes), as such dyne values have been observed to allow sufficient bonding between the metal barrier layer and the PET film. Typically, the bonding strength or, in other words, the strength of the metal adhesion to the PET film, is greater than 150 g/in and, preferably, greater than 250 g/in as measured by first laminating a strip of an ionomer resin (e.g., Surly, DuPont de Nemours and Company, Wilmington, Del.) to the deposited metal layer on the film and then removing the metal by pulling on the resulting film-ionomer laminate in a tensile tester according to Association of International Metallizers, Coaters, and Laminators (AIMCAL) guidelines for measuring metal adhesion to films.

In other embodiments the primer layer is constructed to have additional barrier properties to further enhance the barrier of the constructed films. Such barrier layers are preferably applied inline during the manufacture of the PET films. However, applying the barrier coatings off-line is also suitable. From a cost perspective, inline application of the barrier coatings can be preferred. Examples of coating suitable for inline coating include polyvinylalcohol, ethylenevinylalcohol, copolymers of polyvinylalcohol and ethylenevinylalcohol and similar materials. When applied, these barrier coatings may provide even further enhanced barrier properties.

Figure 8:
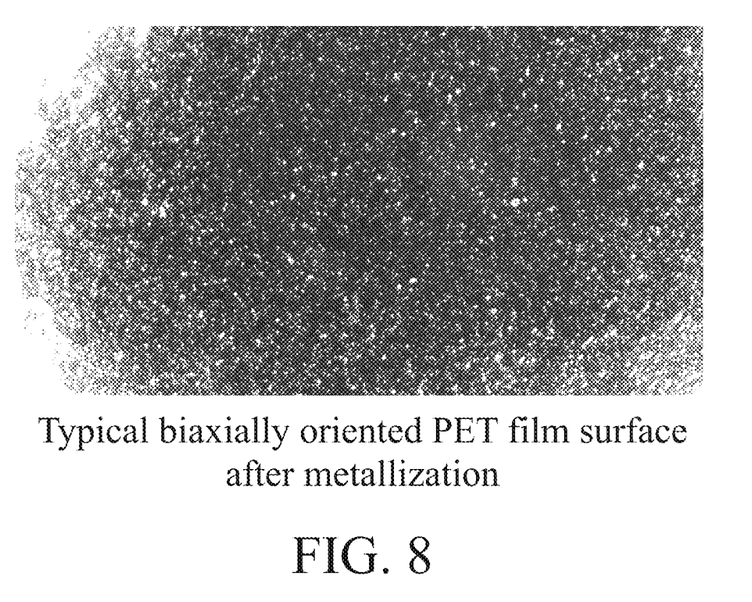
FIG. 8 is a photomicrograph of a conventional metalized film.
Figure 9:
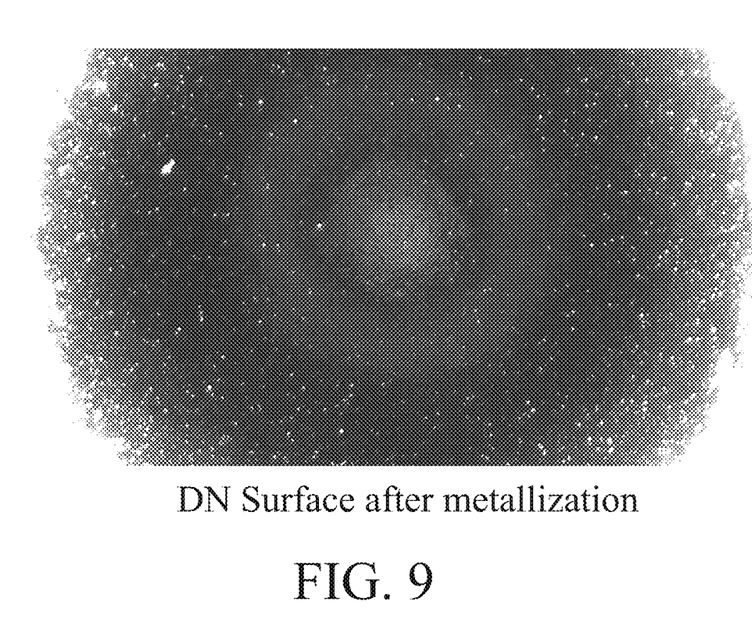
FIG. 9 is a photomicrograph of a metalized film containing a dispersed nylon containing PET showing dramatic surface metal smoothness enhancements.

As a further refinement to the presently-described high-barrier films, in some embodiments, the film is provided having a surface roughness, Sra, (i.e., a roughness of the surface to which the metallized layer is applied) of less than about 5 nm including, in some embodiments, less than about 4.5 nm, less than about 4.0 nm, less than about 3.5 nm, less than about 3.0 nm, less than about 2.5 nm, less than about 2.0 nm, less than about 1.5 nm, and less than about 1.0 nm. Measurement of such surface roughness (Sra) values can be made by using any number of surface metrology methods known to those skilled in the art, including, but not limited to, the use of laser profiling and needle stylus methods. FIGS. 8 and 9 show the metrology differences between DN and non-DN metallized surfaces. The photomicrographs of FIGS. 8 and 9 show dramatic surface metal smoothness enhancements due to the proposed enhanced metal seeding properties of the DN layers.

Barrier measurements were done using MOCON Oxytran equipment at 23° C. and 0% relative humidity in the case of $O_2TR$ and MOCON Permatran equipment at 35° C. and 90% relative humidity in the case of MVTR. The instruments were calibrated per the manufacturer's recommended methodologies to ensure consistency of results.

The presently-disclosed subject matter is further illustrated by the following specific but non-limiting examples.

EXAMPLES

Example 1

Preparation of High-Barrier Film

Polyethylene terephthalate (PET) resin with a desired intrinsic viscosity (IV) was dried and crystallized. In this example, the IV of the PET resin was 0.62. However, as will be appreciated by those skilled in the art, the IV is not so limited, and may include any other suitable IV for forming the high-barrier film. This PET resin was combined with a silica containing master resin at a variable concentration. The resulting resin blend was then extruded using a single screw extruder train and subsequently filtered through a mesh filter stack. In this example, the extruded resin blend was filtered through a 25 μm mesh filter stack. However, similar to the IV above and as will be appreciated by those skilled in the art, the filter is not so limited and may include any other suitable filter for forming the high-barrier film.

A secondary resin stream was chosen as plain dispersed nylon containing PET (DN) or a blend of dispersed nylon PET blended with silica containing master resin of PET. The dispersed Nylon resin can be produced either through co-extrusion of a core-shell chip or through highly mixing the dispersed material in a twin-screw extruder. In the case of a twin-screw extruder, the mixing process must be sufficient to homogenize the phase structure. Poor mixing will result in increased haze and is thus not desirable in a commercial process.

After filtering, the molten silica containing PET resin was combined in a feed-block with the secondary resin stream. Conventional co-extrusion through a feedblock or multi-layer die is convenient to produce filmic structures with multiple layers. This technique can be modified with the use of a square mixer process to increase the number of layers significantly. In addition to increasing the number of layers, processing suitably constructed DN resin using a square mixer layer stacking concept is thought to further increase the barrier properties of the DN stack. The viscosity of the multilayers must be sufficiently matched to prevent defects such as layer encapsulation of low viscosity materials and other flow related problems. Through this process, the thickness of the DN resin containing outer layer (21) to the core layers (11) of the core portion (10) could be modified.

The resultant combined resin streams were casted onto a chilled roller and subsequently stretched in the longitudinal and cross directions to about a factor of 3.5× by 4×. The overall thickness of the biaxially oriented film (FIG. 1) was 12 μm.

Figure 2:
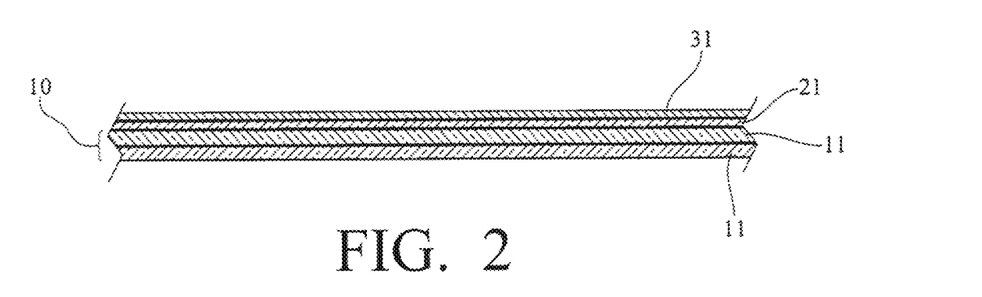
FIG. 2 is a schematic diagram of a metallized film including a single layer of dispersed nylon containing PET, according to an embodiment of the disclosure.

The biaxially oriented film was then vacuum metalized. In this process aluminum wire is heated and a gaseous cloud of aluminum vapor condenses on the surface of the biaxially oriented film. As illustrated in FIG. 2, for example, the condensed aluminum vapor forms a metallized layer (31) over one or more surfaces of the biaxially-oriented film. Variable density of aluminum deposition is possible.

Examples 2 and 3 Illustrate Multi-Stack Films with a Single Layer of Dispersed Nylon Containing PET Example 2

2.5 μm Layer of Dispersed Nylon Containing PET

Figure 1:
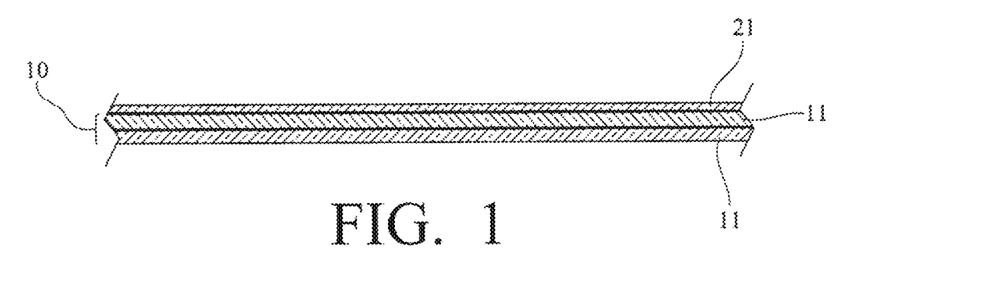
FIG. 1 is a schematic diagram of a film including a single layer of dispersed nylon containing PET, according to an embodiment of the disclosure.

In this example, the structure of FIG. 1 was prepared in the manner described in Example 1, with the outer layer (21) including DN at a thickness of 2.5 μm, and the core layers (11) including a combination of PET and silica containing PET at a ratio of 80:20. This film was vacuum metalized to an optical density of 2.6 (FIG. 2). Oxygen and moisture barrier measurements of the films were done before and after metalizing. These films gave an $O_2$TR value of less than 0.10 CC $M^2$/Day and an MVTR of less than 0.05 G $M^2$/Day. The improvement over standard film was greater than 10×.

Example 3

1.5 μm Layer of Dispersed Nylon Containing PET

In this example, the structure of FIG. 1 was prepared in the manner described in Example 1, with the outer layer (21) including DN at a thickness of 1.5 μm, and the core layers (11) including a combination of PET and silica containing PET at a ratio of 80:20. This film was vacuum metalized to an optical density of 2.6 (FIG. 2). Oxygen and moisture barrier measurements of the films were done before and after metalizing. The oxygen barrier was determined to be about 0.16 CC $M^2$/Day and the MVTR was measured as 0.3 G $M^2$/day. The improvement to the oxygen barrier over standard metalized films are about 8×.

Example 4 Illustrates a Multi-Stack Film with a Dual Layer of Dispersed Nylon Containing PET Example 4

Dual Layer of Dispersed Nylon Containing PET

Figure 3:
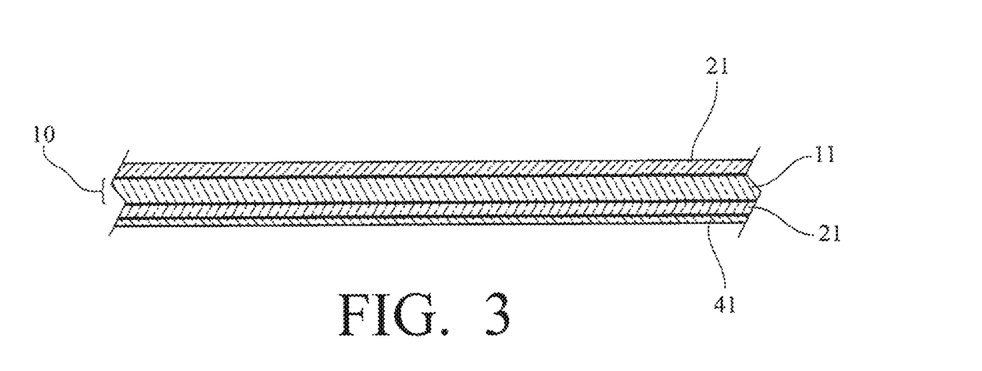
FIG. 3 is a schematic diagram of a film including a dual layer of dispersed nylon containing PET, according to an embodiment of the disclosure.

In this example, the structure of FIG. 3 was prepared in the manner described in Example 1, with the core portion (10) including a single core layer (11) comprising a combination of PET and silica containing PET at a ratio of 80:20, and the outer layers (21) on opposite sides of the core portion (10) including a combination of DN and silica containing DN at a ratio of 90:10. To form the outer layers (21) on opposite sides of the core portion (10), the DN resin was split into two sections and recombined with the core layer melt stream.

On one side of the film, an acrylic slip coating (41) was applied inline. This film was vacuum metalized to an optical density of 2.6 on the uncoated DN side of the film. Oxygen and moisture barrier measurements were done on the films before and after metalizing. The oxygen barrier was determined to be about 0.08 CC $M^2$/Day and the MVTR was determined to be about 0.12 G $M^2$/Day. The improvement over standard metalized PET films was about 10×.

The acrylic coating resin in this case is not critical from a barrier performance point of view. This coating material should be selected so as to be processable inline and to provide good friction control properties. Without wishing to be bound by theory, it is believed that inclusion of the acrylic slip coating (41) decreases winding difficulties with this type of structure.

Comparative Example 4a

A multilayer film was prepared as in Example 4 except without the use of the DN phase. This film was acrylic coated to decrease the winding difficulties as well. The $O_2$ gas barrier of this film was measured and was found to be about 122 cc $M^2$/day. Little to no contribution to gas barrier properties of the film is therefore noted from inclusion of the acrylic coating layer.

Examples 5 and 6 Illustrate Comparative Structures

Comparative Example 5

Multi-Stack Film Without Dispersed Nylon

Figure 4:
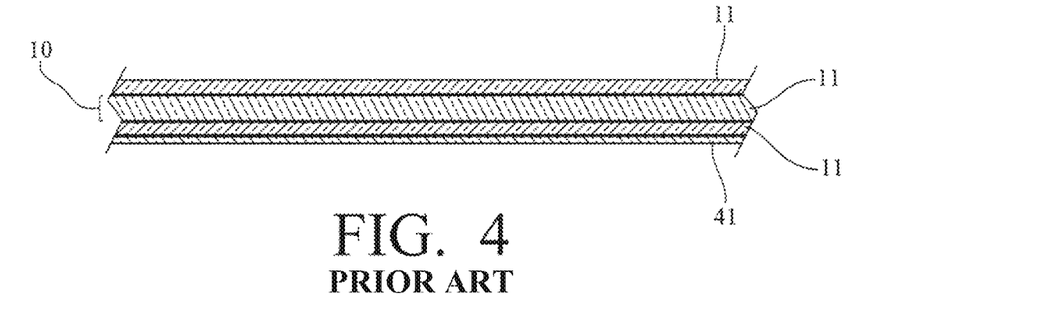
FIG. 4 is a schematic diagram of a comparative film devoid of a dispersed nylon containing PET layer.

In this comparative example, the structure of FIG. 4 was prepared without the use of the DN resin, resulting in a film where both the core layer (11) and the outer layers (21) comprise a combination of PET and silica containing PET at a ratio of 80:20. The structure of this example also includes a corona treatment layer (41) over the outer layer (21) on one side of the core portion (1). This film was also vacuum metalized to an optical density of 2.6 on the side opposite corona treatment layer (41). The oxygen barrier was determined to be about 0.9 CC $M^2$/Day and the MVTR was about 1.1 G $M^2$/day.

Comparative Example 6

Multi-Stack Film with Metallized Layer Opposite DN Layer

In this comparative example, the structure of FIG. 1 was prepared in the manner described in Example 1, with the outer layer (21) including DN at a thickness of 2.5 µm, and the core layers (11) including a combination of PET and silica containing PET at a ratio of 80:20. However, instead of vacuum metalizing on the side including the outer layer (21), this film was vacuum metalized to an optical density of 2.6 on the side opposite the outer layer (21) (FIG. 5). Although barrier enhancement was achieved over conventional oriented PET film, the barrier enhancement is much less than the case when the aluminum is deposited on the DN face of the film.

Example 7 Illustrates a Multi-Stack Film with a Dual Layer of Dispersed Nylon Containing PET and a Metallized Layer Over Each Layer of Dispersed Nylon Containing PET

Example 7

Dual Metallized Layers Over Layers of Dispersed Nylon

In this example, the structure of FIG. 6 was prepared in the manner described in Example 4, with the core portion (10) including a single core layer (11) comprising a combination of PET and RGG/silica at a ratio of 80:20, and the outer layers (21) on opposite sides of the core portion (10) including a combination of DN and silica containing DN at a ratio of 95:5. An acrylic slip coating (41) was applied inline on one side of the film, and then the film was vacuum metalized to an optical density of 2.6 on the both DN containing sides of the film.

This technique can be done on a commercial basis for the potential replacement of Al foil. In this case oxygen gas barrier properties as low as 0.01 CC-0.03 CC $M^2$/Day have been achieved.

Comparative Example 7

A multilayer film was prepared as described in Example 7, except without the use of DN materials in either of the outer surfaces. In this case, each surface was vacuum metalized with aluminum to a per side optical density of about 2.6. The oxygen gas barrier properties were measured and found to be about 0.23-0.25 cc $M^2$/day. When compared to the film containing two separate DN phases and metalized on both sides, the barrier is significantly worse.

AlOx Vapor Deposition

Example 8a

As in the case of Example 2, a multilayer DN containing biaxially oriented polyester 12 µm film was prepared. The film was then vapor deposited with clear aluminum oxide (AlOx) in a vacuum chamber on the 2.2 µm DN layer. This film was then subsequently topcoated with a polyurethane coating. The $O_2$TR was found to be about 0.35 cc $M^2$/day, and the MVTR was found to be about 0.4 g $M^2$/day.

Comparative Example 8b

A multilayer film was prepared as in Example 2 but without the DN containing layer. This 12 µm biaxially oriented film as then vapor deposited with AlOx and subsequently topcoated with a polyurethane coating. The $O_2$TR was found to be about 0.8 cc $M^2$/day, and the MVTR was found to be about 0.9 g $M^2$/day.

Example 9—Comparison of Examples

Table 1 below shows a comparison of the properties measured from the examples above.

TABLE 1

| Example | DN Layers | DN Layer Thickness (µm) | Aluminum Optical Density Side 1 | Aluminum Optical Density Side 2 | $O_2$TR CC $M^2$/Day | Barrier Improvement Factor | Notes |
|---|---|---|---|---|---|---|---|
| Example 1 | 1 | 2.5 | 0 | N/A | 130 | N/A | |
| Example 2 | 1 | 2.5 | 2.6 | N/A | 0.1 | 10X | |
| Example 3 | 1 | 1.5 | 2.6 | N/A | 0.16 | 5-8X | |
| Example 4 | 2 | 1.5 | 2.6 | N/A | 0.08 | 10-12X | |
| Comparative Example 4a | 0 | N/A | 0 | N/A | 122 | N/A | |
| Comparative Example 5 | 0 | N/A | 2.6 | N/A | 0.90 | N/A | |
| Comparative Example 6 | 1 | 2.5 | 2.6 | N/A | 0.4 | 2.2 | Film was metalized on opposite side of DN layer |
| Example 7 | 2 | 1.1 | 2.6 | 2.6 | 0.03 | 9X | |
| Comparative Example 7 | 0 | 0 | 2.6 | 2.6 | 0.23 | | |
| Example 8a | 1 | 2.2 | (Clear AlOx) | N/A | 0.35 | 2.2 | AlOx |
| Comparative Example 8b | 0 | N/A | (Clear AlOx) | N/A | 0.8 | N/A | AlOx |

Throughout this document, various references are mentioned. All such references are incorporated herein by reference.

Additionally, it will be understood that various details of the presently disclosed subject matter can be changed without departing from the scope of the subject matter disclosed herein. Furthermore, the foregoing description is for the purpose of illustration only, and not for the purpose of limitation.

The invention claimed is:

1. A high barrier biaxially-oriented PET film, comprising:
   a core of one or more biaxially-oriented PET layers;
   one or more outer layers of a nylon dispersed in PET positioned on the core, wherein the dispersed nylon has a dispersion size of less than about 200 nm, wherein the nylon is not poly(m-xylene-adipamide); and
   a metal barrier layer disposed on at least one of the one or more outer layers.

2. The high barrier oriented PET film of claim 1, wherein at least one of the one or more PET layers comprises a PET homopolymer.

3. The high barrier oriented PET film of claim 1, wherein at least one of the one or more PET layers comprises a PET layer with one or more additives.

4. The high barrier oriented PET film according to claim 1, wherein at least one of the one or more PET layers comprises a PET copolymer.

5. The high barrier oriented PET film according to claim 4, wherein the PET copolymer comprises PET and one or more additional co-monomers of diethylene glycol, propylene glycol, neopentyl glycol, polyalkylene glycols, 1,4-butane diol, 1,3-propane diol, adipic acid, sebacic acid, malonic acid, succinic acid, isophthalic acid, or 2,6-naphthalenedicarboxylic acid.

6. The high barrier oriented PET film according to claim 1, wherein the metal barrier layer comprises at least one of aluminum, silicon oxide, or aluminum oxide.

7. The high barrier oriented PET film according to claim 1, wherein the metal barrier layer is applied in an amount sufficient to provide an oxygen transmission rate of less than 1.0 cc/m$^2$/day.

8. The high barrier oriented PET film according to claim 1, further comprising at least one coating positioned over the core and/or the at least one of the one or more outer layers.

9. The high barrier oriented PET film according to claim 8, wherein the at least one coating comprises an acrylic coating, a polyurethane coating, a polysulphonester coating, a quaternary ammonium-based coating, or a mixture thereof.

10. The high barrier oriented PET film according to claim 8, wherein the at least one coating is an acrylic coating.

11. The high barrier oriented PET film according to claim 10, wherein the acrylic coating comprises an acrylic resin, which is a resin having one or more monomer components of an alkyl acrylate, an alkyl methacrylate, 2-hydroxyethyl acrylate, 2-hydroxyethyl methacrylate, 2-hydroxypropyl acrylate, 2-hydroxypropyl methacrylate, acrylamide, methacrylamide, N-methyl acrylamide, N-methyl methacrylamide, N-methylol acrylamide, N-methylol methacrylamide, N,N-dimethylol acrylamide, N-methoxymethyl acrylamide, N-methoxymethylmethacrylamide, N-phenyl acrylamide, N,N-diethylamino ethyl acrylate, N,N-diethylamino ethyl methacrylate, glycidyl acrylate, glycidyl methacrylate, acrylic acid or a salt thereof, or methacrylic acid or a salt thereof.

12. The high barrier oriented PET film according to claim 10, wherein the acrylic coating further comprises one or more cross-linking agents.

13. The high barrier oriented PET film according to claim 12, wherein the one or more cross-linking agents comprise melamine-based cross-linkers, epoxy-based cross-linkers, aziridine-based cross-linkers, epoxyamide compounds, titanate-based coupling agents, oxazoline-based cross-linkers, isocyanate-based cross-linkers, methylolurea or alkylolurea-based cross-linkers, aldehyde-based cross-linkers, or acrylamide-based cross-linkers.

14. The high barrier oriented PET film according to claim 12, where the one or more cross-linking agents produce a cross-linked acrylic coating having a cross-linking density of greater than about 10%.

15. The high barrier oriented PET film according to claim 10, wherein the film is corona treated.

* * * * *